US011965564B2

(12) United States Patent
Falk

(10) Patent No.: US 11,965,564 B2
(45) Date of Patent: Apr. 23, 2024

(54) TORQUE-LIMITING CLUTCH COMPRISING A RELEASE TRIGGER MECHANISM

(71) Applicant: C FALK REMOTE CONTROL AB, Hudiksvall (SE)

(72) Inventor: Curt Falk, Hudiksvall (SE)

(73) Assignee: C FALK REMOTE CONTROL AB, Hudiksvall (SE)

( * ) Notice: Subject to any disclaimer, the term of this patent is extended or adjusted under 35 U.S.C. 154(b) by 0 days.

(21) Appl. No.: 18/239,913

(22) Filed: Aug. 30, 2023

(65) Prior Publication Data

US 2023/0407925 A1 Dec. 21, 2023

Related U.S. Application Data

(62) Division of application No. 17/266,695, filed as application No. PCT/SE2019/050710 on Jul. 26, 2019, now Pat. No. 11,773,924.

(30) Foreign Application Priority Data

Aug. 8, 2018 (SE) .................................... 1850960-4

(51) Int. Cl.
*F16D 43/286* (2006.01)
*F16D 25/04* (2006.01)

(52) U.S. Cl.
CPC ......... *F16D 43/286* (2013.01); *F16D 25/046* (2013.01)

(58) Field of Classification Search
CPC ...... F16D 43/284; F16D 43/286; F16D 43/04; F16D 43/26; F16D 25/046
See application file for complete search history.

(56) References Cited

U.S. PATENT DOCUMENTS 4,264,229 A 4/1981 Falk
4,341,484 A * 7/1982 Peterson ............... F16D 1/0805
192/85.13

(Continued)

FOREIGN PATENT DOCUMENTS

DE 3742658 A1 7/1989
DE 4225523 A1 2/1994

(Continued)

OTHER PUBLICATIONS

International Search Report from corresponding International Application No. PCT/SE2019/050710, dated Oct. 25, 2019, 4 pages.

(Continued)

*Primary Examiner* — Huan Le
(74) *Attorney, Agent, or Firm* — Tucker Ellis LLP

(57) ABSTRACT

A clutch for a rotary shaft includes an annular pressure chamber with a sleeve surface engaging a surface to drivingly connect the shaft to the clutch, and further includes a trigger device and a channel system activatable by the trigger device upon a relative angular movement between the shaft and the chamber to release the shaft from the housing. The trigger device has a cam wheel having a constant first radius across a first angular interval and a second, smaller, radius across a second angular interval. The cam wheel is supported on an envelope surface within the first angular interval and rotating in relation to the envelope surface when the shaft rotates in relation to the housing. When a contact point reaches the second angular interval, the cam wheel is displaced to activate said channel system.

14 Claims, 7 Drawing Sheets

(56) References Cited

U.S. PATENT DOCUMENTS

| | | | |
|---|---|---|---|
| 4,923,320 A | | 5/1990 | Klischat |
| 4,944,377 A | | 7/1990 | Elsner |
| 4,982,617 A | | 1/1991 | Muenker |
| 5,069,320 A | * | 12/1991 | Falk .................. F16D 43/211 |
| | | | 464/30 |
| 5,201,842 A | | 4/1993 | Elsner |
| 5,386,897 A | | 2/1995 | Yang |
| 6,761,256 B2 | | 7/2004 | Falk |
| 7,410,042 B2 | | 8/2008 | Ochab |
| 2010/0089716 A1 | | 4/2010 | Falk |
| 2012/0006290 A1 | | 1/2012 | Noguchi |

FOREIGN PATENT DOCUMENTS

| | | |
|---|---|---|
| DE | 9406199 U1 | 6/1994 |
| EP | 0386729 A1 | 9/1990 |
| JP | 2014134268 A | 7/2014 |

OTHER PUBLICATIONS

Swedish Search Report from Swedish Application No. 1850961-2, dated Feb. 7, 2019, 2 pages.
International Search Report and Written Opinion from International Application No. PCT/SE2019/050711, dated Oct. 14, 2019, 11 pages.
European Extended European Search Report from European Application No. EP19846874, dated Sep. 14, 2021, 5 pages.

* cited by examiner

TORQUE-LIMITING CLUTCH COMPRISING A RELEASE TRIGGER MECHANISM

This application is a continuation of U.S. application Ser. No. 17/266,695, filed Feb. 8, 2021, which is a national phase entry of International Application No. PCT/SE2019/050710, filed Jul. 26, 2019, and claims the benefit of Swedish Application No. 1850960-4, filed Aug. 8, 2018, the disclosure of which are incorporated herein by reference in their entireties.

The present invention relates to a clutch for a rotary shaft, and in particular to a clutch arranged to limit a torque of such a rotary shaft.

The prior art comprises many different such torque limiting clutches. In particular for very large torques in relation to shaft dimension, it has proven to be more problematic to present adequate solutions. In particular, there is a need for such a torque limiting clutch having small dimensions, low weight and with the capacity of quickly being reset after a disengaging mechanism has been tripped.

A prior art clutch generally of the present type is disclosed in SE0602818, comprising a housing having a thin-walled sleeve that forms an axially extended wall of an annular chamber in turn having a small radial thickness. The chamber is arranged to be supplied with a pressurized fluid for substantially elastic deformation of the sleeve, so that a surface of the sleeve engages a smooth complementary shaped surface of a shaft to be drivingly connected to the clutch. The chamber is connected to the clutch, and is connected to a channel system which is arranged to be activated upon a relative movement between the shaft and the clutch into a state in which the pressurized fluid can flow through the channel system away from the chamber, in order to allow the shaft to rotate independently of the clutch. The disengagement mechanism is tripped when a support leg, resting against an envelope surface of the shaft and being supported on said surface with a limited pivotal stability, due to a relative angular movement between the shaft and the clutch falls over and as a result affects the state of a valve evacuating the pressurized fluid from the chamber.

This design suffers from a number of problems.

Firstly, when the disengaging mechanism of the clutch is tripped, the pressurized fluid leaving the chamber will leak out from the mechanism, which leads to soiling and possibly also to environmental problems.

Secondly, the disengaging mechanism is incapable of allowing very short torque spikes without being tripped, which is desirable in certain applications.

Thirdly, the pressure in the chamber will generally vary with operating temperature, leading to a shift in the absolute torque required to trip the disengagement mechanism. A similar effect will be the result of a small leakage in the pressurized fluid. In general, the larger the sealed surfaces used in the construction are, the more the leakage. For instance, for a clutch used with a 100 mm diameter shaft, a leakage of 1 ml of fluid will normally make the clutch useless.

Fourthly, in order to limit leakage, the thin-walled sleeve is normally welded to the housing. The weldable material used will typically have a relatively low hardness, in turn leading to the risk of seizing damage between the clutch and the shaft if the disengagement mechanism is not tripped properly.

The present invention solves at least some of the above described problems.

Hence, the invention relates to a clutch for a rotary shaft, said clutch comprising an annular chamber, a housing and a thin-walled sleeve forming an axially extended thin wall of the annular chamber, which chamber is arranged to be supplied with a pressurized fluid for substantially elastic deformation of the sleeve, so that a surface of the sleeve engages a smooth complementary shaped surface so that the shaft is drivingly connected to the clutch, the clutch further comprising a trigger device and a channel system activatable by said trigger device upon a relative angular movement between the shaft and the housing, the chamber being connected to said channel system and the channel system being arranged to, when it is activated by said trigger device, assume a state in which the pressurized fluid can flow through the channel system away from the chamber, so that the shaft can rotate independently of the housing, and is characterised in that the trigger device comprises a cam wheel, in that the cam wheel has a substantially constant first radius across a first angular interval and a second radius across a second angular interval, which second radius is smaller than the first radius, in that the cam wheel is arranged to be supported on an envelope surface at a contact point being within the first angular interval, in that the cam wheel is arranged to rotate in relation to envelope surface as a result of a relative angular movement between the shaft and the housing, in that the trigger device is arranged to, when the cam wheel rotates so that the said contact point becomes located within the second angular interval, displace the cam wheel radially towards the envelope surface and as a result activate said channel system.

In the following, the invention will be described in detail, with reference to exemplifying embodiments of the invention and to the enclosed drawings, wherein.

All figures share the same reference numerals for the same or corresponding parts.

Figure 1:
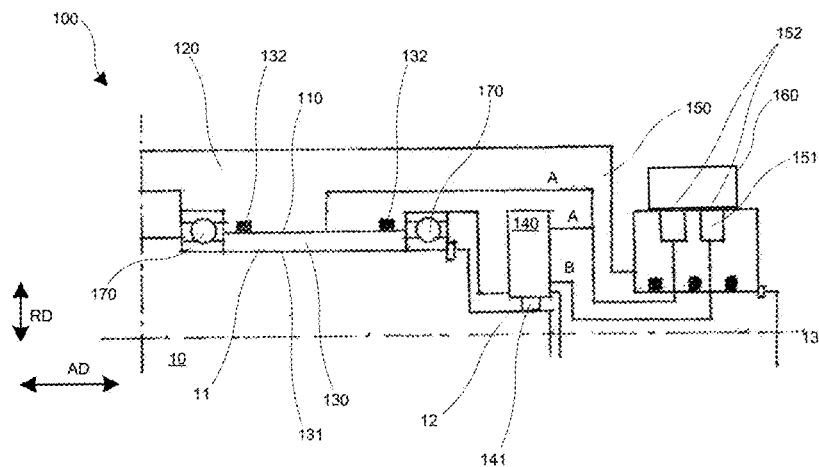
FIG. 1 is an overview diagram over a clutch according to a first exemplifying embodiment of the present invention with a fixed control means and a swivel function.
Figure 2:
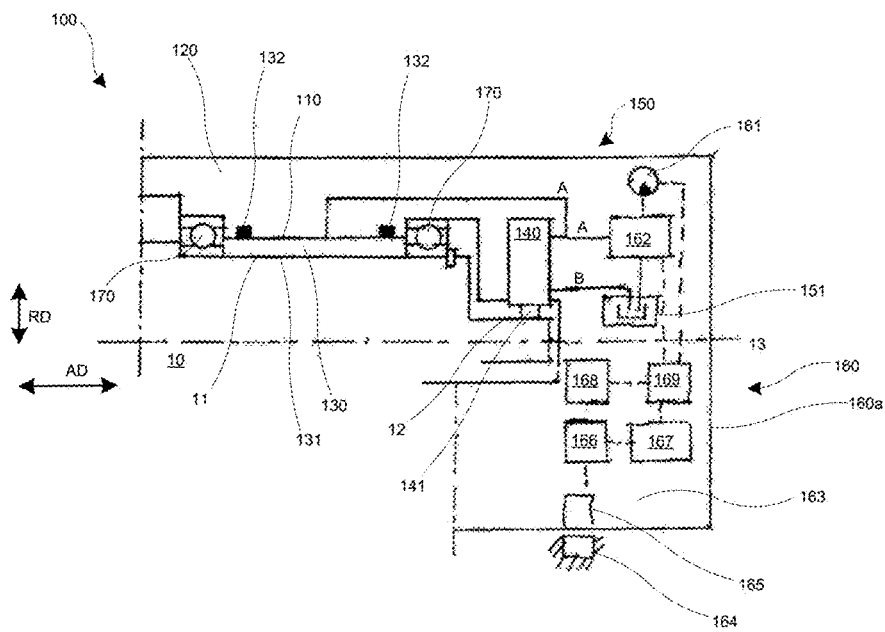
FIG. 2 is an overview diagram over a clutch according to a second exemplifying embodiment of the present invention with a rotating control means.

Hence, FIGS. 1 and 2 both illustrate a respective exemplifying clutch 100 for a rotary shaft 10. The shaft 10 is associated with an axial or length dimension AD, a radial dimension RD and a central symmetry axis 13. The clutch 100 comprises an annular chamber 110 arranged to be filled with pressurized fluid, such as oil or water depending on application. The clutch 100 further comprises a housing 120 and a radially thin-walled sleeve 130, forming an axially extended thin limiting wall of the annular chamber 110.

Figure 6:
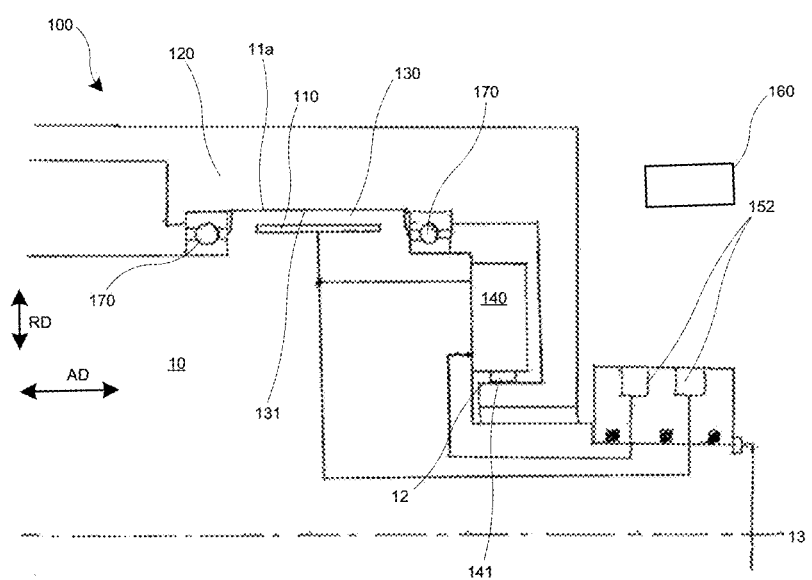
FIG. 6 is an overview diagram over a clutch according to a third exemplifying embodiment of the present invention, in which the clutch is partly arranged as a part of a shaft.

In all three embodiments shown in FIGS. 1, 2 and 6, the clutch 100 is arranged to be drivingly connected to the shaft 10 by the housing 120 being rotationally engaged with the shaft, via a friction engagement as described herein. Then, a load or similar can be attached for rotary movement to the housing 120.

The chamber 110 is arranged to be supplied, via a supply or lead channel A belonging to a channel system 150, with a pressurized fluid for substantially elastic deformation of the sleeve 130, so that an external surface 131 of the sleeve 130 engages a smooth complementary shaped surface, so that the shaft 10 as a result engages with the housing 120, hence becomes drivingly connected to the housing 120. That the deformation of the sleeve 130 is "substantially elastic" means that the sleeve 130 is not permanently deformed by the application of such pressure in the chamber 110, but returns to a rest state once the pressure in the chamber 110 is returned to a lower pressure, such as atmospheric pressure, by releasing the fluid via a return channel B also belonging to the channel system 150. The housing 120 may be substantially rigid, in the sense that it is not deformed by applying said fluid pressure in the chamber 110 sufficiently to materially affect the friction engagement between the housing 120 and the shaft 10.

In FIGS. 1 and 2, the said complementary shaped surface is a complementary shaped surface 11 of the shaft. However, in FIG. 6, the sleeve 130 is arranged as a part of the shaft 10, so that the sleeve surface 131 is a surface of the shaft 10, and the complementary shaped surface 11a is a part of the housing 120. Hence, in the embodiment illustrated in FIG. 6, the clutch 100 comprises both parts being integrated with the shaft 10 (such as the chamber 110) and parts that are disjoint from the shaft 10 (such as the housing 120). It is realized that the sleeve 130 and the other parts illustrated as parts of the shaft 10 in FIG. 6 may be formed from the shaft 10 material as materially integrated component parts, or be permanently or non-permanently fastened to the shaft by suitable fastening means in connection to the assembly of the clutch 100 and/or the mounting of the clutch 100 on the shaft 10.

Throughout this description, it is noted that the clutch 100 may comprise component parts being arranged as a part of the shaft 10 and/or as external parts not being a part of the shaft 10, as is exemplified in FIGS. 1, 2 and 6, as long as the friction grip engaging the clutch 100 is performed between the shaft 10 and the housing 120.

The housing 120 is rotationally engaged with the shaft 10 using bearings 170, such as conventional ball or roll bearings.

Hence, by applying a liquid pressure in the chamber 110 via channel A, the said elastic deformation presses the said external surface 131 against the said complementary shaped surface 11, 11a, providing a friction engagement between the housing 120 and the shaft 10. By releasing the pressure in the chamber 110, the elastic deformation is reversed, and the friction engagement between the housing 120 and the shaft 10 is again released, preferably creating a certain play between surfaces 11/11a, 131. The general principle of friction engagement using a pressure chamber is well-known as such, and is extensively described, for instance, in SE0602818. Therefore, it is not described in further detail herein.

In order to limit a torque between the shaft 10 and the housing 120, the clutch 100 further comprises a trigger device 140 and the said channel system 150. The channel system 150 is activatable by said trigger device 140 upon a relative angular movement between the shaft 10 and the housing 120. The trigger device 140 is hence arranged to automatically detect a relative angular movement between the shaft 10 and the housing 120 which occurs in spite of the friction engagement between the two, and to automatically release the friction engagement upon such relative movement detection, hence disengaging the clutch 100 from the shaft 10. This disengagement is hence achieved by the trigger device 140 activating the channel system 150 so that the fluid can quickly be evacuated from the chamber 110 via channel B, thereby lowering the fluid pressure in the chamber 110 to a pressure at which the elastic deformation of the sleeve 130 is restored sufficiently for a play to accrue between the said surfaces 131, 11.

Hence, the chamber 110 is connected to the channel system 150 for said fluid evacuation. As will be described below, the chamber 110 may be directly connected to channel A, and be indirectly, via trigger device 140, connected to channel B.

Hence, the channel system 150 is arranged to, when it is activated by said trigger device 140, assume a state in which the pressurized fluid can flow through channel B of the channel system 150 out from and away from the chamber 110, so that the shaft 10 can rotate independently of the housing 120.

According to a first aspect of the invention, illustrated in FIG. 2, the clutch 100 further comprises a control means 160, arranged to receive said fluid being evacuated from the chamber 110 by flowing through channel B of the channel system 150, out of and away from the chamber 110, when the clutch 100 is disengaged from the shaft 10. Furthermore, the control means 160 is also arranged with a pump 161, in turn arranged to pump said fluid from the control means 160, via channel A, to the chamber 110, so as to achieve the fluid pressure therein described above, achieving said elastic sleeve 130 deformation and hence engaging the housing 120 with the shaft 10. The control means 160 may further comprise a pressure regulator 162, arranged to receive pressurized fluid from the pump 161 and to provide a controlled and desired fluid pressure over channel A to the chamber 110. The pressure regulator may also comprise a pressure sensor, arranged to measure the instantaneous chamber 110 fluid pressure and to communicate the detected pressure to a controlling CPU 169 or similar.

Further according to this first aspect of the invention, the control means 160 is fixedly arranged in relation to the clutch 100, so that the control means 160 is arranged to rotate with the shaft 10 together with the rest of the clutch 100.

Still further according to this first aspect of the invention, the clutch 100 further comprises a generator means 163, arranged to harvest electric energy from the mechanical rotation of the shaft 10. Moreover, the generator means 163 is arranged to power the control means 160, in particular the operation of the said pump 161. Preferably, all electric energy required to operate the control means 160 and its various component parts 161, 162, 163, 166, 167, 168, 169 (see below) originates from the rotation energy harvesting in the generator means 163, possibly apart from an initial electric charge present in a battery 167.

Hence, the control means 160 may be arranged to both provide fluid of the above described type to the chamber 110 and to accept such return fluid from the chamber 110 upon disengagement of the clutch 100 via said activation of the channel system 150. This way, the clutch 100 may be designed as a complete, self-contained system, arranged to substantially in its entirety be mounted on and rotate together with the shaft 10. Since the amount of fluid which is required to achieve the above-described friction engagement between surfaces 131, 11 is typically relatively small, the fluid may be circulated in a closed-loop system (as will be described in more detail below) without adversely affecting the performance of the shaft 10 in many applications. This not only facilitates the design a simple, modular system, but is also advantageous from an environmental standpoint since fluid leakages can be kept to a minimum by return fluid during disengagement being reused rather than being released out from the clutch 100.

In particular, FIG. 2 shows a micro hydraulic control means 160 built into a plate 160a which is bolted directly to the clutch 100 and connected to channels A and B of the channel system 150. The hydraulic control means 160 is electrically driven by a battery 167, which is charged via a charging regulator 166 in turn receiving induction pulses via a rotor 165, in the form of a permanent wound magnet, moving in relation to a stator 164, being stationary, fixed and separated from the rest of the clutch 100. It is noted that the stator 164 is the only part of the clutch 100 which is required to be mounted as a separate unit, not rotating with the shaft 10. The stator 164, being a passive component not requiring electricity mains or other connections, may easily be fastened on a suitable stationary structure in the vicinity of the clutch 100, depending on the specific application.

Hence, the said generator means 163 may comprise the stator 164, which is stationary and does not rotate with the shaft 10, as well as the rotor 165, which is fixed to the control means 160 and therefore rotates with the shaft 10.

As described above, the control means 160 may further comprise the battery 167, arranged to be powered by the generator means 163, and the battery 167 may further be arranged to power the pump 161.

The micro hydraulic control means 160 may furthermore be controlled by a CPU 169 or other integrated circuit, such as a conventional on-chip microcomputer. Hence, the CPU 169 may be arranged to communicate with and control the operation of the pump 161 as well as the pressure regulator 162. This operation may advantageously be remote-controllable using a radio control signal (or other wireless control signal) receiving means 168 arranged to receive and interpret radio wave signals (or other wireless signals) emitted from a remote-control unit (not shown in the figures). This way, the clutch 100 may be engaged, disengaged or reset by remote command of a user, even in case the housing 120 rotates at high speeds with the shaft 10. The pump 161 delivers fluid to the pressure regulator 162. Return fluid enters via port B to container or tank 151.

Hence, the control means 160 may further comprise said wireless remote-control receiver 168, arranged to receive said remote-control signals for controlling the operation of the control means 160.

In a preferred embodiment, the control means 160 is arranged to drivingly connect (engage) the housing 120 to the shaft 10, by applying the above described sufficiently large fluid pressure into the chamber 110, and to disconnect (disengage) the housing 120 from the shaft 10 by lowering said fluid pressure in the chamber 110 so as to achieve a play between surface 131, 11/11a. This engaging and disengaging of the clutch 100 may take place by the CPU 169 controlling the pressure regulator 162, via suitable and per se conventional electric signalling, so as to regulate the fluid pressure in channel A, and hence in the chamber 110, to a desired value.

In particular, the control means 160 may be arranged to, during engaged operation of the housing 120 for driving connection to the shaft 10, control the fluid pressure in the chamber 110 to be substantially constant at a set desired value, which value is application-specific but in general preferably is between 100 and 1000 bars, and the control means 160 is arranged to control the pressure to the set pressure with a tolerance of about ±1% or less.

As is illustrated in FIG. 2, the return fluid from the trigger device 140, and ultimately from the chamber 110, arrives in the container 151 for the return fluid. The container 151 may be in fluid connection with the pump 161, so that the fluid being provided to the chamber 110 by the pressure regulator 162 is taken from the container 151. Of course, the container 151 is also a part of the control means 160, rotating with the shaft 10.

During operation, the shaft 10 may rotate with at least 10 rpm, but in some applications the shaft may rotate with up to about 5000 rpm. For rotations above 500 rpm, it is preferable to arrange the container 151 with an overpressure, such as an overpressure of about 1 bars or more.

This way, the control means 160 may be arranged to circulate the said fluid in a closed loop circuit, comprising the chamber 110 and the container 151 for the fluid, to which container 151 the fluid flowing through the channel system 150 away from the chamber 110 is led via channel B.

As the total amount of fluid required to operate the engagement and disengagement of the clutch 100 is generally small, this allows a very compact and small clutch 100 design. In particular, this type of arrangement has proven to be very efficient in the preferred cases in which a total amount of fluid used, in other words the total amount of fluid in said closed loop, is at the most 0.2% of the total material volume of the housing 120. In many applications, this means that the total amount of fluid in the closed loop will be less than 10 ml.

In particular, the fluid capacity of the chamber 110 may advantageously be between 25% and 75% of the total fluid volume, such as at the most 5 ml.

As described above, the control means 160 comprises the pressure regulator 162, in turn being arranged to communicate a detected pressure measurement value to the CPU or microcomputer 169. In this case, and in other cases where the control means 160 has access to an updated information regarding changes in the chamber 110 fluid pressure, the control means 160 may be arranged to sense a sudden chamber 110 pressure drop in the fluid. The control means 160 may then preferably be arranged to, as a result, quickly depressurize the fluid, such as by controlling the pressure regulator 162 to this end. The fluid may then, for instance, be allowed to quickly escape the chamber 110 via channel A and the pressure regulator 162, to again be received in container 151 for reuse in a subsequent clutch 100 engaging step. This fluid evacuation can be performed very quickly, which is important in order to avoid shaft 10 damages once the clutch 100 is disengaged. Namely, when the clutch 100 is disengaged due to a detected relative angular movement between shaft 10 and housing 120, it is important that a complete clutch 100 disengagement is achieved automatically and quickly by the control means 160, so as to avoid any direct physical contact between surfaces 11/11a and 131 after disengagement. Preferred modes for this mechanism will be described in further detail below. The disengagement may be detected by the control means 160 as said sudden pressure drop of the fluid, which pressure drop exceeds a predetermined limit pressure difference and/or a predetermined limit pressure time gradient.

The chamber 110 fluid pressure control performed by the control means 160 may also be arranged to, during engaged operation of the clutch 100, compensate for small volume changes arising as a result of operating temperature changes and small fluid leakage over time, hence providing a very constant chamber 110 fluid pressure. Consequently, the threshold torque required to trigger the disengagement of the clutch 100 will be stable and well-defined over time. At the same time, the control means 160 can then very quickly and reliably engage and disengage the clutch 100, by regulating the fluid pressure in channel A.

In particular, this is facilitated by the pressure regulator 162 being directly connected to the chamber 110, via channel A. Via such a direct connection, the pressure regulator 162 may measure the fluid pressure intermittently or continuously, and as a result regulate the chamber 110 pressure in real-time or near real-time. The pressure regulator 162 preferably measures the chamber pressure 100 at least once every hour (for large couplings), preferably at least every minute (for smaller couplings). In order to achieve said direct fluid communication between the pressure regulator 162 and the chamber 110, it is specifically preferred that there are no valves preventing the free flow of the fluid, and in particular no non-return valves, arranged between the pressure regulator 162 and the chamber 110.

Conventionally, the sleeve 130 is welded to the housing 120 so as to minimize leakage, as described above. The above-described continuous regulation of the chamber 110 fluid pressure however makes it possible to accept a certain small fluid leakage over time without negatively affecting the performance of the clutch 100, the reason being that such small leakage which result over non-welded rotary joints are typically is very small in relation to the total amount of fluid used in the clutch 100.

In particular, it is preferred that the sleeve 130 is sealed to the housing 120 not by welding, but instead using a gasket seal, such as rubber O-rings or any other conventional gasket seal comprising an elastic sealing material.

Such seal will not provide as good fluid containment as a welded seal, but will on the other hand make it possible to use a sleeve 130 manufactured from a hard metal material, such as high-speed steel (HSS) or metal materials with extreme hardness, such as cemented carbide, which is preferred. Such hard metal material may not be weldable, and may also be a different material than that of the housing 120. This provides adequate performance of the clutch 100 at the same time as the risk of material shaft 10 or clutch 100 damage due to seizing is minimized in case the clutch 100 for some reason malfunctions and does not instantaneously release its grip when slipping in relation to the shaft.

Furthermore, when the sleeve 130 is made from such a not easily welded, hard metal material, this provides a preferred way of making it possible to safely design the clutch 100 to release its grip on the shaft 10 with a certain time or angular slipping delay (such as in the way described in detail below), in turn admitting short torque spikes without releasing its grip.

Figure 4:
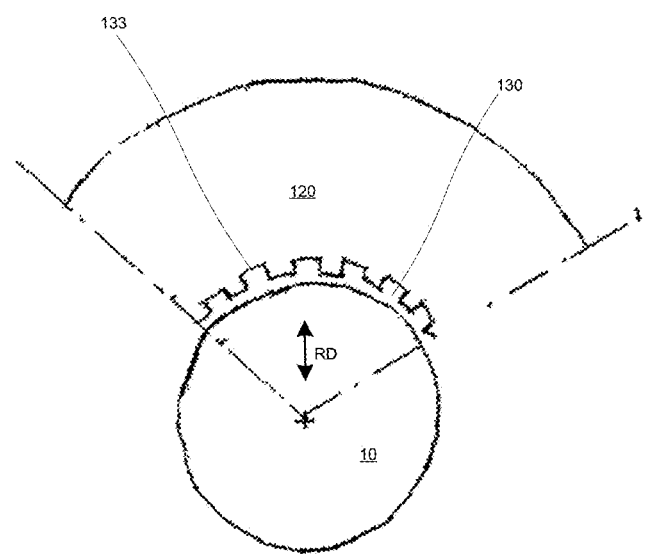
FIG. 4 is a cross-sectional view, along a cross-section of an axis taken in a radial-angular plane, of a sleeve arrangement according to the present invention.

In order to force the sleeve 130 to rotate in unison with the housing 120, and as a result guarantee the geometric integrity of the chamber 110, the sealed sleeve 130 is preferably in angular engagement with the housing 120. One preferred way of achieving such angular engagement is illustrated in FIG. 4, in which it is illustrated that the sleeve 130 is in angular spline engagement with the housing 120, using cooperating splines 133 arranged on the sleeve 130 and the housing 120, respectively, said splines 133 extending in the axial dimension AD when the clutch 100 is mounted on the shaft 10.

In the case illustrated in FIG. 6, in which the sleeve 130 is a part of the shaft, the corresponding solution can be achieved by arranging seals corresponding to seals 132 but sealing the sleeve 130 to the rest of the shaft 10. Then, the sleeve 130 can be made from a different, non-weldable and hard, material than that of the rest of the shaft 10. Such material can be of the above described type. Also, a spline engagement corresponding to 133 may be provided between such a sleeve 130 and the rest of the shaft 10.

Turning now to FIG. 1, an alternative embodiment of the present invention is illustrated, in which the control means 160 does not rotate with the shaft 10, but is instead stationary. In this case, the channel system 150 of the clutch 100 comprises a sealed swivel means 152, arranged to supply said fluid to and from the control means 160 via the swivel means 152. In FIG. 1, the container 151 is illustrated as being arranged in connection to the swivel means 152, even though it is realized that the container 151 may also be arranged in the control means 160 itself.

The swivel means 152 may be conventional as such, such as comprising sealed rotation-symmetrical tracks arranged to interact with orifices travelling along said tracks, and will not be described in detail here. Such a swivel means 152 may be arranged to provide only a small fluid leakage during operation, and is therefore useful with a continuous pressure monitoring control device 160 with the pressure regulator 162 in direct fluid communication with the chamber 110, via the swivel means 152, as has been described above with a stationary arranged control device 160 rather than one which rotates with the shaft 10.

FIGS. 3A-3D and FIG. 5 illustrate a second aspect of the present invention, according to which the trigger device 140 comprises a cam wheel 141. As used herein, the term "cam wheel" denotes a structure arranged to roll across an envelope surface 12, in the shaft 10 angular direction, and which has a cam periphery shape comprising a varying rolling radius.

In FIGS. 1 and 2, the trigger device 140 is fixedly arranged to the housing 120, and the cam wheel 141 rolls across an envelope surface 12, such as an external envelope surface 12, of the shaft 10. However, it is realized that the trigger device 140 may alternatively be fixedly arranged to the shaft 10, and the envelope surface across which the cam wheel 141 rolls then being an envelope surface, such as an internal envelope surface, of the housing 120. What is important is that the cam wheel rolls as an angular movement between the shaft 10 and the housing 120. In the following, the first case will be described. However, it is realized that the invention is equally applicable to the second case.

Figure 3A:
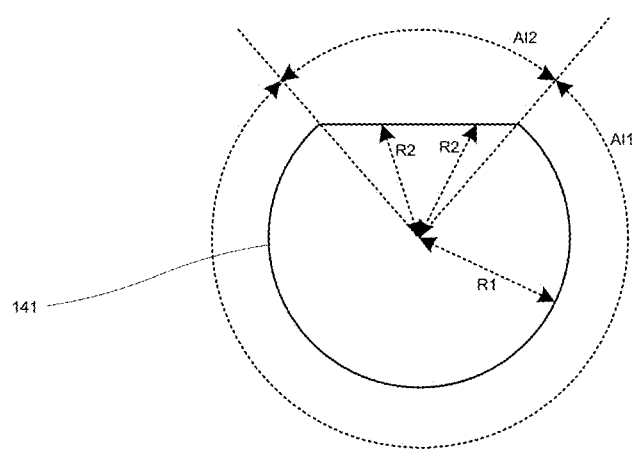
FIG. 3A is a cross-sectional view of an exemplifying embodiment of a cam wheel according to the present invention.

In particular, the cam wheel 141 has a substantially constant first radius R1 across a first angular interval AI1 and a second radius R2 across a second angular interval AI2, which second radius R2 is smaller than the first radius R2, see FIG. 3A. Preferably, the second radius R2 is variable across the second angular interval AI2, as opposed to the first radius R1 being constant across the first angular interval AI1.

That the first radius R1 is "substantially constant" means that the cam wheel 141 is arranged to move in a substantially rolling fashion over the envelope surface 12 across the first angular interval AI1, as opposed to be folded over or moved in a step-wise manner across the first angular interval AI1. Hence, small continuous first radius R1 increases or decreases may be present across the first angular interval AI1, which increases or decreases are then preferably arranged symmetrically about a first angular interval AI1 centre point. However, it is preferred that the first radius R1 is simply constant across the first angular interval AI1.

Further according to this second aspect of the invention, the cam wheel 141 is arranged to be supported on said envelope surface 12 of the shaft 10 at a contact point, between the cam wheel 141 and the shaft 10 envelope surface 12, being within the first angular interval AI1 of the cam wheel 141 when the clutch 100 is in its engaged state. Moreover, the cam wheel 141 is arranged to rotate, from the said contact point and in relation to the shaft 10 envelope surface 12, as a result of a relative angular movement between the shaft 10 and the housing 120 (the cam wheel 141 being fixed to the housing 120 in the shaft 10 angular direction). Then, the trigger device 140 is arranged to, when the cam wheel 141 rotates so that the said contact point becomes located within the second angular interval AI2, displace the cam wheel 141 radially towards the shaft 10 envelope surface 12 and as a result activate said channel system 150 to evacuate the fluid from the chamber 110 as described above.

Such a construction of the trigger device 140, which is hence arranged to rotate together with the shaft 10 and the rest of the clutch 100, provides a very reliable triggering of the clutch 100 disengagement upon a detected relative angular movement (in the shaft angular direction) between the shaft 10 and the housing 120. Furthermore, the smallest relative such angular movement required to trigger the disengagement of the clutch 100 can be very precisely predefined, achieving a clutch 100 allowing well-defined torque spikes to occur without disengaging the clutch 100 from the shaft 10. The chamber 110 fluid pressure, which may be finely regulated as described above, defines a maximum allowed torque, while the cam wheel 141, defining a minimum relative angular movement, defines a maximum sliding of the clutch 100 before being disengaged.

In particular, that the first radius R1 is "constant" (or "substantially constant" as defined above) means that the cam wheel 141 has a (substantially) constant radius, and hence is designed as a circular-symmetric wheel, across the whole first angular interval A1. On the other hand, that the second radius R2 is "variable" means that the wheel rolling radius varies across at least part of the second angular interval AI1. It is preferred, as is illustrated in FIG. 3A, that the first AI1 and second AI2 angular intervals together form a continuous angular interval, which may cover 3600 of cam wheel 141 rotation, and that the first R1 and second R2 radii are the same at angular border points between the respective angular intervals AI1, AI2. This provides for a smooth rolling action of the cam wheel 141 on the envelope surface, without the trigger device 140 being supported by the cam wheel 141 performing any harsh movements radially in relation to the shaft 10.

That the second radius R2 is "smaller" than the first radius R1 means that it is strictly smaller than the first constant radius R1 across the whole open-ended second interval AI2. Preferably, the second radius R2 as a function of cam wheel 141 angle describes a curve the angular secondary derivative of which is >0 for all cam wheel 141 angles across the second interval A2.

As illustrated in FIG. 3A, the second radius R2 may be defined so as to comprise a substantially linear, flat surface on the cam wheel 141, possibly with smoothed ends connecting to the first angular interval AI1. Such a flat surface will provide a well-defined and stable landing surface for the contact between the cam wheel 141 and the envelope surface 12 when the clutch 100 is disengaged.

FIGS. 3B-3D and 5 each show a respective cross-section through the trigger device 140, where the fluid is led in via a port of channel A and, as the trigger device 140 is tripped, out via a port of channel B.

Figure 3B:
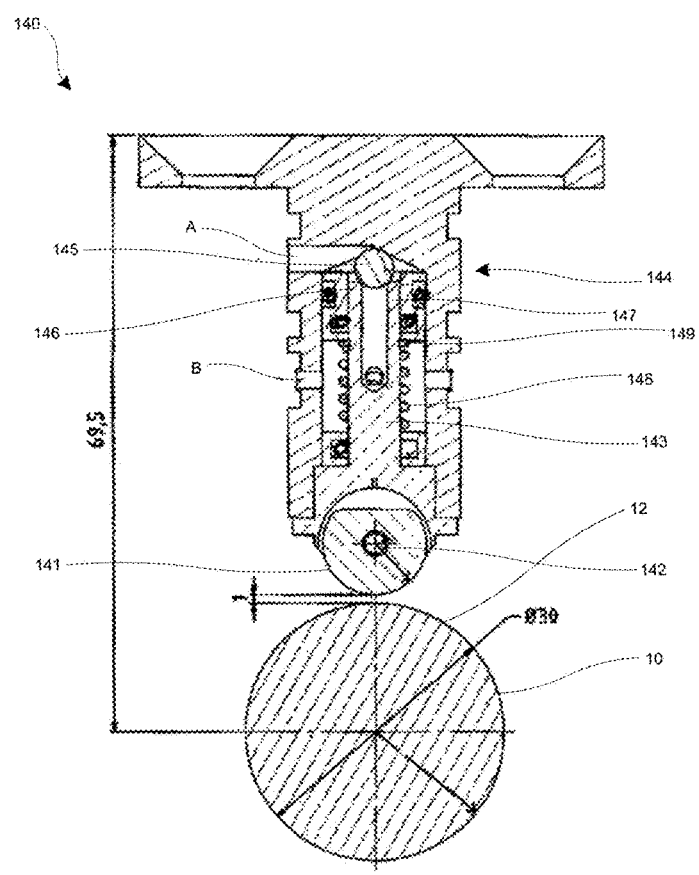
FIG. 3B is a cross-sectional view of a valve or trigger device arrangement according to the invention, in a first, non-pressurized state.

FIG. 3B shows the trigger device 140 and the position of its component parts in a non-pressurized state, in which the clutch 100 is disengaged from the shaft 10 and a play is present between the cam wheel 141 and the shaft 10 envelop surface 12. The play in this disengaged state is preferably at least about 0.2% of the shaft 10 diameter, in many applications at least about 1 mm.

Figure 3C:
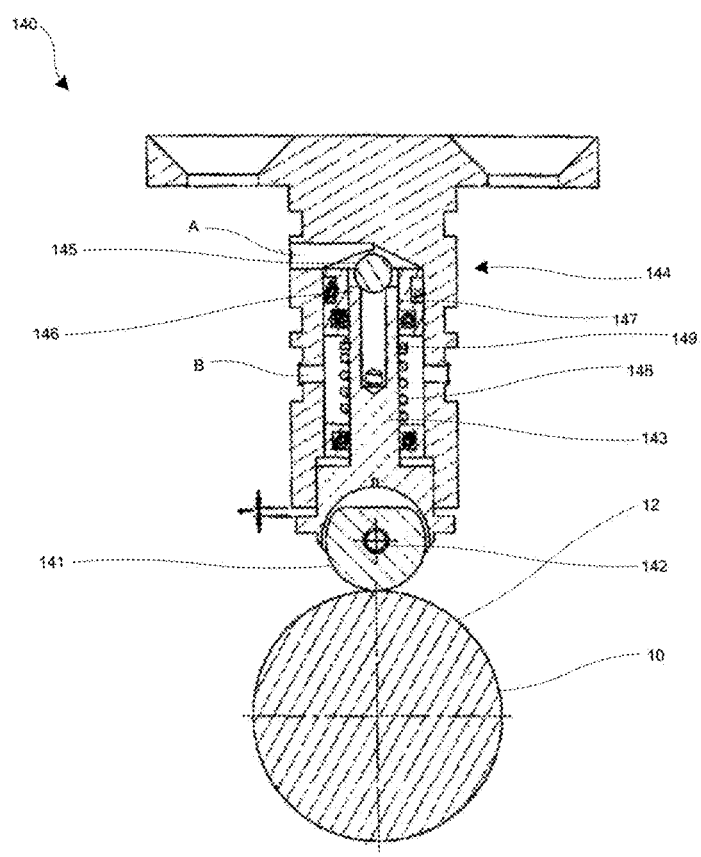
FIG. 3C is a cross-sectional view of the valve or trigger device arrangement illustrated in FIG. 3B, but in a second, pressurized and engaged state.

FIG. 3C shows the trigger device 140 and the position of its component parts in a pressurized chamber 110 fluid state, in which the housing 120 is engaged with the shaft 10 and the cam wheel 141 abuts the shaft 10 envelope surface 12 directly. The cam wheel 141, in this engaged state of the clutch 100, preferably applies (in a way which will be described in the following) a pressing force against the shaft 10 the size of said pressing force being determined by the fluid pressure in the chamber 110 due to a direct fluid communication between the chamber 110 and the trigger device 140 via channel A. Preferably, there are no valves preventing the free flow of the fluid, and in particular no non-return valves, arranged between the chamber 110 and the trigger device 140.

As will be understood from the following, the trigger device 140 functions as a valve for the pressurized fluid present in the chamber 110 and being communicated to the trigger device 140 via channel A, releasing this incoming fluid out through channel B upon detection of a relative angular movement between the shaft 10 and the trigger device 140 and hence the housing 120. At the same time, the pressurized fluid in the chamber 110 is used to urge the cam wheel 141 against the shaft 10 envelope surface 12 so as to be able to detect said relative angular movement via rolling of the cam wheel 141.

Hence, the cam wheel 141 may be supported on a piston means 143 comprised in the trigger device 140, which piston means 143 is arranged to be radially movable and to press the cam wheel 141 radially against the shaft 10 envelope surface 12 under influence of a pressure of said pressurized fluid in the chamber 110 being applied to the piston means 143 when the mentioned contact point between the cam wheel 141 and the envelope surface 12 is within the first angular interval AI1. Hence, when the fluid in the chamber 110 is pressurized, the trigger device 140 is automatically activated by urging the cam wheel 141 into contact with the shaft 10. In other words, the control means 160 is able to activate and engage the clutch 100 by applying the above mentioned predetermined fluid pressure in the chamber 110.

Figure 3D:
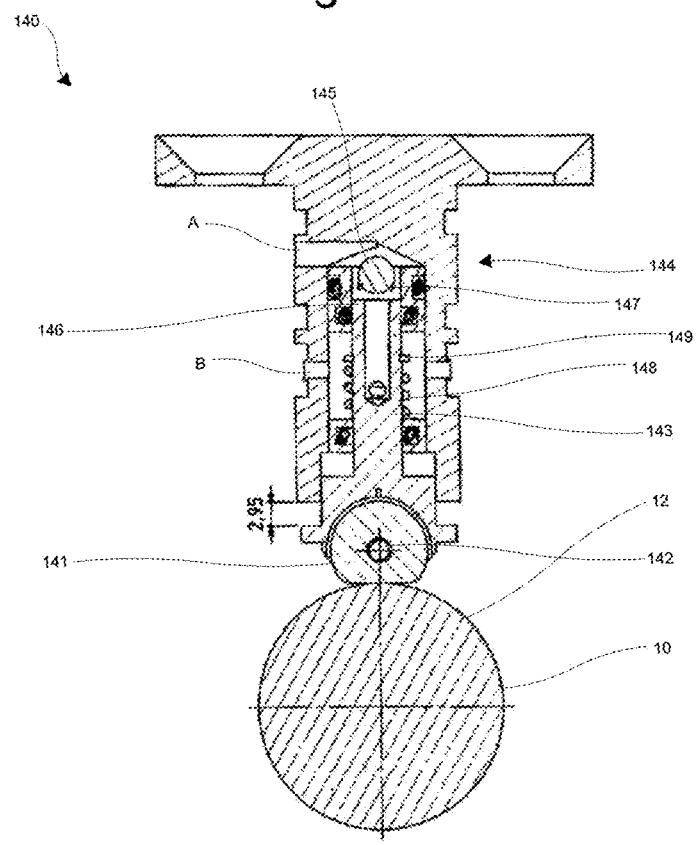
FIG. 3D is a cross-sectional view of the valve or trigger device arrangement illustrated in FIG. 3A, but in a third, tripped and disengaged state.

The piston means 143 is further arranged to, when the said contact point due to cam wheel 141 rolling action moves, and becomes arranged within the second angular interval AI2, further force the cam wheel 141 to move radially RD towards the shaft 10 envelope surface 12 under the influence of said fluid pressure. The resulting state of the piston means 143 and the cam wheel 141 is illustrated in FIG. 3D.

The piston means 143 may be spring loaded radially away from the shaft 10, with a force which is less than the opposite-directed force achieved on the piston means 143 by the pressure of the pressurized fluid described above. Hence, the piston means 143 is arranged so that, in the absence of a pressure force from the pressurized fluid in the chamber 110, it achieves a radial distance, such as of at least about 0.2% of the shaft 10 diameter, in many applications at least about 1 mm, between the shaft 10 envelope surface 12 and the cam wheel 141 when the said contact point is within the first interval AI1.

When the trigger device 140 is tripped, and disengages the clutch 100, the control means 160 is preferably arranged to quickly detect the sudden fluid pressure drop in the chamber 110, and as a result decrease the pressure to a rest pressure, such as atmospheric pressure. As a result, the piston means 143 is no longer pressed by the fluid pressure radially towards the shaft 10, and the spring means 148 can then force the piston means 143 radially away from the shaft 10. As a result, when the said contact point between the cam wheel 141 and the shaft 10 envelope surface 12 is within the second angular interval AI2, there is also preferably a play, such as of at least about 0.2% of the shaft 10 diameter, in many applications at least about 1 mm, between the cam wheel 141 and the shaft 10 envelope surface 12.

Preferably, the piston means 143 may comprise a non-return valve 144, which non-return valve 144, when the said contact point is within the first interval AI1, is in a closed state to prevent the pressurized fluid from flowing past the non-return valve 144, and which non-return valve 144, when the said contact point is within the second interval AI2, such as due to the pressing force provided by the pressurized fluid, is in an opened state, so that the pressurized fluid can flow past the non-return valve 144.

Figure 5:
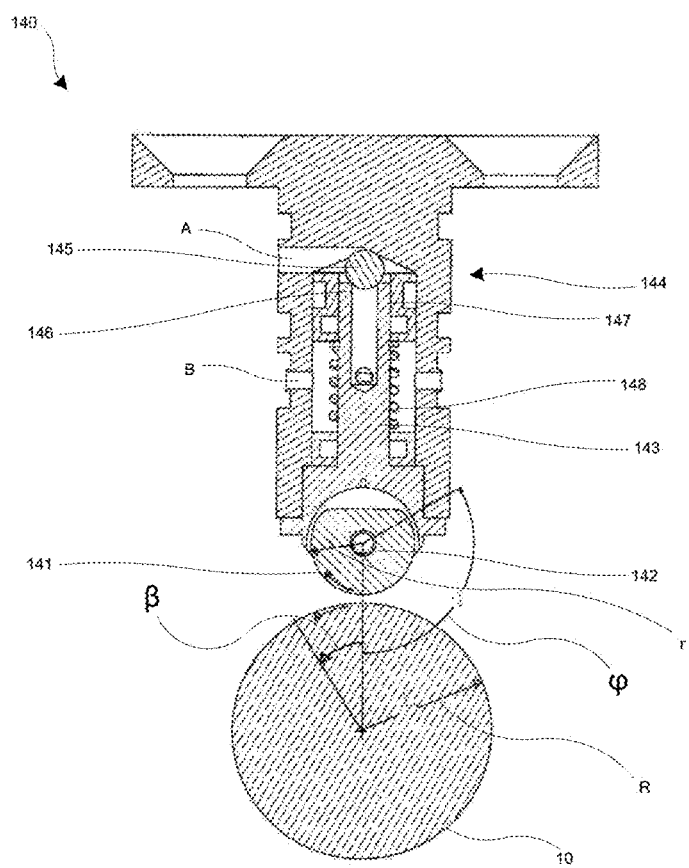
FIG. 5 is a cross-sectional view of a valve or trigger device arrangement for use with a clutch according to the present invention, with illustrated rotation angles for calculating clutch tolerances.

In particular, and as is illustrated in FIGS. 3B-3C and FIG. 5, the non-return valve 144 comprises a movable body 145, such as a valve ball. The non-return valve 144 may also comprise a first body seat 146, such as a sealing ball seat, arranged to radially move with the piston means 143; and a second stationary body seat 147, which does not radially move with the piston means 143. Then, the movable body 145 is arranged to be sealingly received in the first body seat 146 (and not in the second body seat 147) when the chamber 110 fluid is pressurized and when the said contact point is within the first interval AI1; and the movable body 145 is arranged to be non-sealingly received not in the first body seat 146 but instead in the second body seat 147 when the chamber 110 fluid is pressurized and when the contact point is within the second interval AI2.

In the state illustrated in FIG. 3B, the spring means 148, which may be a coil spring or any other suitable spring, presses the piston 143, via a retainer ring 149, radially away from the shaft 10 towards the ball 145, in turn being supported by the housing 120 or a fixed part of the trigger device 140, providing a seal to the ball seat 146. In this state, there is a radial play, such as of at least about 0.2% of the shaft 10 diameter, in many applications at least about 1 mm, between the cam wheel 141 and the shaft 10 envelope surface 12. The fluid cannot pass the non-return valve 144, due to the first ball seat 146 seal.

According to a preferred embodiment, the trigger device 140 comprises a second spring means 142, such as a torsion spring, arranged to apply an angular force with respect to the cam wheel 141 and its own angular rolling direction, urging the cam wheel 141 to assume a position in which the contact point between the cam wheel 141 and the shaft 10 envelope surface 12 is located within the first angular interval AI1. Hence, the cam wheel 141 is held in the correct angular starting position using the torsion spring, so that this angular position is maintained as fluid pressure is applied and the clutch is engaged with the shaft 10.

Preferably, said angular force is arranged to urge the cam wheel 141 to assume a position in which said contact point between the cam wheel 141 and the shaft 10 envelope surface 12 is located in the angular centre of the first angular interval AI1. This achieves that the cam wheel 141 can rotate the same corresponding shaft 10 angular distance in either direction before the contact point reaches the second angular interval AI2 and the trigger device 140 therefore is tripped. In other words, the housing 120 is then allowed to slip in relation to the shaft 10 the same shaft 10 angular distance in either direction before being disengaged.

In the example illustrated in FIG. 3B, the cam wheel 141 can be turned about ±120° without triggering the disengagement of the clutch 100, which means that the shaft 10 can be turned β°, where β is calculated according to the following formula:

$$\beta = \frac{\varphi r}{R}.$$

FIG. 5 illustrates the rotation angle β achieved by the shaft 10 before the housing 120 releases its grip, given variables φ (the cam wheel 141 angular distance travelled by the cam wheel 141 before it reaches the second angular interval AI2), r (the first radius R1 of the cam wheel 141) and R (the radius of the shaft 10 envelope surface 12).

The envelope surface 12 may be a surface of the shaft 10 which is lathed down or padded to a desired radius, depending on application.

One advantage with this second aspect of the present invention is that the cam wheel 141 can be designed with a first angular interval AI1 selected so as to precisely define a rotary slipping tolerance of the housing 120 before being automatically disengaged. As disclosed above, this slipping tolerance will depend on the variables φ, r and R. An important thing to note is that the value of φ easily can be altered by replacing the cam wheel 141 for a different cam wheel with a different value for φ, in other words a cam wheel 141 for which the first angular interval AI1 is different from a replaced cam wheel 141. This way, the slipping tolerance of the clutch may easily be altered. Hence, it is preferred that the cam wheel 141 is replaceable, such as via a screw or snap-in engagement with the rest of the trigger device 140.

In general, it is preferred that cam wheels 141 used with the present invention have first angular intervals that are at least 30° of width, so that the cam wheel 141 must roll at least 15° in at least one rolling direction before the trigger device 140 is tripped and the clutch 100 as a result is automatically disengaged.

FIG. 3C illustrates the trigger device 140 and the position of its component parts in a state in which hydraulic fluid pressure is applied through channel A. The ball 145 is sealingly pressed against its first ball seat 146, leading to the piston 143 being brought, by said hydraulic fluid pressure, radially towards the shaft 10 (downwards in FIG. 5), pressing the cam wheel 141 down into direct physical contact with and against the shaft 10 envelope surface 12.

When full fluid pressure has been reached, the shaft 10 can be rotation driven in a desired manner. As described above, an allowed torque is defined by the friction force between the sleeve 130 and the complementary shaft 10 surface 11 (alternatively housing 120 surface 11a), in turn being determined by the set fluid pressure in the chamber 110. In case this allowed torque is exceeded, the sleeve 130 starts to slip angularly in relation to the shaft 10 surface 11 (or surface 11a), which results in the cam wheel 141 starting to roll angularly across the shaft 10 envelope surface 12, see FIG. 3D.

As the cam wheel 141 has reached a limit of the first angular interval AI1, in the illustrated, exemplifying case after a cam wheel 141 rotation of about 120° in either direction, the contact point enters the second angular interval AI2 and as a result thereof the anvil provided by the cam wheel 141 collapses, why the piston 143 is pressed (by the fluid pressure force) radially towards the shaft 10 envelope surface 12 a certain collapsing distance, in this case about 2 mm but which may be from about 0.5 mm to about 5 mm. The ball 145 is stopped by the second ball seat 147, which is arranged not to provide a fluid seal between the ball 145 and the second ball seat 147, whereby the fluid can flow freely past the ball 145 and out through channel B, further to the container 151 as described above. This will produce an instantaneous fluid pressure drop in the chamber 110.

The pressure regulator 162 will then, as described above, detect this sudden fluid pressure drop, and as a reaction instantaneously control the chamber 110 fluid pressure to substantially zero overpressure. This, in turn, will cause the trigger device 140 to be returned to the state illustrated in FIG. 3B, by spring action of spring means 148, and the torsion spring 142 will make sure that the cam wheel 141 is returned to the rest state with the desired starting contact point facing and being parallel to the shaft 10 envelope surface 12.

As mentioned above, it is preferred that fluid flowing past the non-return valve 144 as a consequence of the trigger device 140 being tripped and the movable body 145 disengaging with its first body seat 146, is led to the container 151 for said fluid, in particular for being reused in the above described closed loop for the fluid.

As described above, the clutch 100 may comprise a control means 160, arranged to control the pressure of the fluid in the chamber 110, which fluid flowing to said container 151 is pumped into the chamber 110 in order to increase the fluid pressure in the chamber 110. Then, it is preferred that the chamber 110 and the piston means 143 are connected, in the sense that there is a direct fluid connection between them of the above-defined type, in particular without any non-return valves between them, so that a fluid pressure present in the chamber 110 will always substantially correspond to said pressure force applied to the piston means 143, urging it radially towards the shaft 10.

Above, preferred embodiments have been described. However, it is apparent to the skilled person that many modifications can be made to the disclosed embodiments without departing from the basic idea of the invention.

For instance, the clutch 100 as described above may comprise additional features not disclosed herein, depending on the specific application. The channel system 150 may be made by drilled channels though the housing, which may be in the form of a piece of massive metal material. Or the channel system 150 may be constructed using external piping. There are numerous such examples of implementation details that may vary.

The embodiments presented herein are in general freely combinable, if compatible. In particular, all which has been said about the first aspect is applicable also the second aspect, and vice versa, as applicable. For instance, the trigger device 140 with the cam wheel 141 can be used in combination with a rotary control means 160 as described in connection to FIG. 2, or with a stationary rotary control means 160 with a swivel connection 152 as described in connection to FIG. 1. The corresponding also applies to the arrangement of sleeve 130, which may be arranged as a part of the housing 120 (as in FIGS. 1 and 2) or a as a part of the shaft 10 (as in FIG. 3).

Hence, the invention is not limited to the described embodiments, but can be varied within the scope of the enclosed claims.

What is claimed is:

1. A clutch for a rotary shaft, said clutch comprising an annular chamber, a housing and a thin-walled sleeve forming an axially extended thin wall of the annular chamber, the chamber being arranged to be supplied with a pressurized fluid for substantially elastic deformation of the sleeve, so that a surface of the sleeve engages a smooth complementary shaped surface so that the shaft is drivingly connected to the clutch, the clutch further comprising a trigger device and a channel system activatable by said trigger device upon a relative angular movement between the shaft and the housing, the chamber being connected to said channel system and the channel system being arranged to, when it is activated by said trigger device, assume a state in which the pressurized fluid can flow through the channel system away from the chamber, so that the shaft can rotate independently of the housing, wherein the clutch further comprises a control means arranged to receive said fluid flowing through the channel system away from the chamber, and also comprising a pump in turn arranged to pump fluid to the chamber so as to achieve said pressure therein, wherein the control means is fixedly arranged in relation to the housing, so that the control means is arranged to rotate with the shaft, wherein the clutch further comprises a generator means arranged to harvest electric energy from the rotation of the shaft, and wherein the generator means is arranged to power the control means.

2. The clutch according to claim 1, wherein the generator means comprises a stationary stator and a rotor fixed to the control means.

3. The clutch according to claim 1, wherein the control means comprises a battery arranged to be powered by the generator means, and wherein the battery is further arranged to power the pump.

4. The clutch according to claim 1, wherein the control means further comprises a wireless remote-control receiver, arranged to receive remote-control signals for controlling the operation of the control means.

5. The clutch according to claim 1, wherein the control means is arranged to drivingly connect the housing to the shaft by applying the said fluid pressure in the chamber, and to disconnect the housing from the shaft by lowering said fluid pressure in the chamber.

6. The clutch according to claim 1, wherein the control means is arranged to circulate the fluid in a closed circuit, comprising the chamber and a container for the fluid to which the fluid flowing through the channel system away from the chamber is led.

7. The clutch according to claim 6, wherein a total amount of fluid in said closed loop is at the most 0.2% of a total material volume of the housing.

8. The clutch according to claim 6, wherein a fluid capacity of the chamber is between 25% and 75% of a total amount of fluid in said closed loop.

9. The clutch according to claim 1, wherein the control means is arranged to, during operation of the clutch for driving connection between the housing and the shaft, control the fluid pressure in the chamber to be substantially constant at a set desired value.

10. The clutch according to claim 9, wherein the said desired value is between 100 and 1000 bars.

11. The clutch according to claim 1, wherein the control means is arranged to sense a sudden pressure drop in the fluid, and as a result depressurize the fluid.

12. The clutch according to claim 1, wherein the sleeve is sealed to the housing using a gasket seal.

13. The clutch according to claim 12, wherein the sleeve is manufactured from a hard metal material, such as high-speed steel or cemented carbide, said hard metal material not being weldable.

14. The clutch according to claim 1, wherein the sleeve is in angular spline engagement with the housing.

* * * * *